June 5, 1962 R. D. SCOTT 3,038,022
INFLATABLE GASKET FOR ISOLATED PHASE BUS
Filed Jan. 31, 1958 3 Sheets-Sheet 1
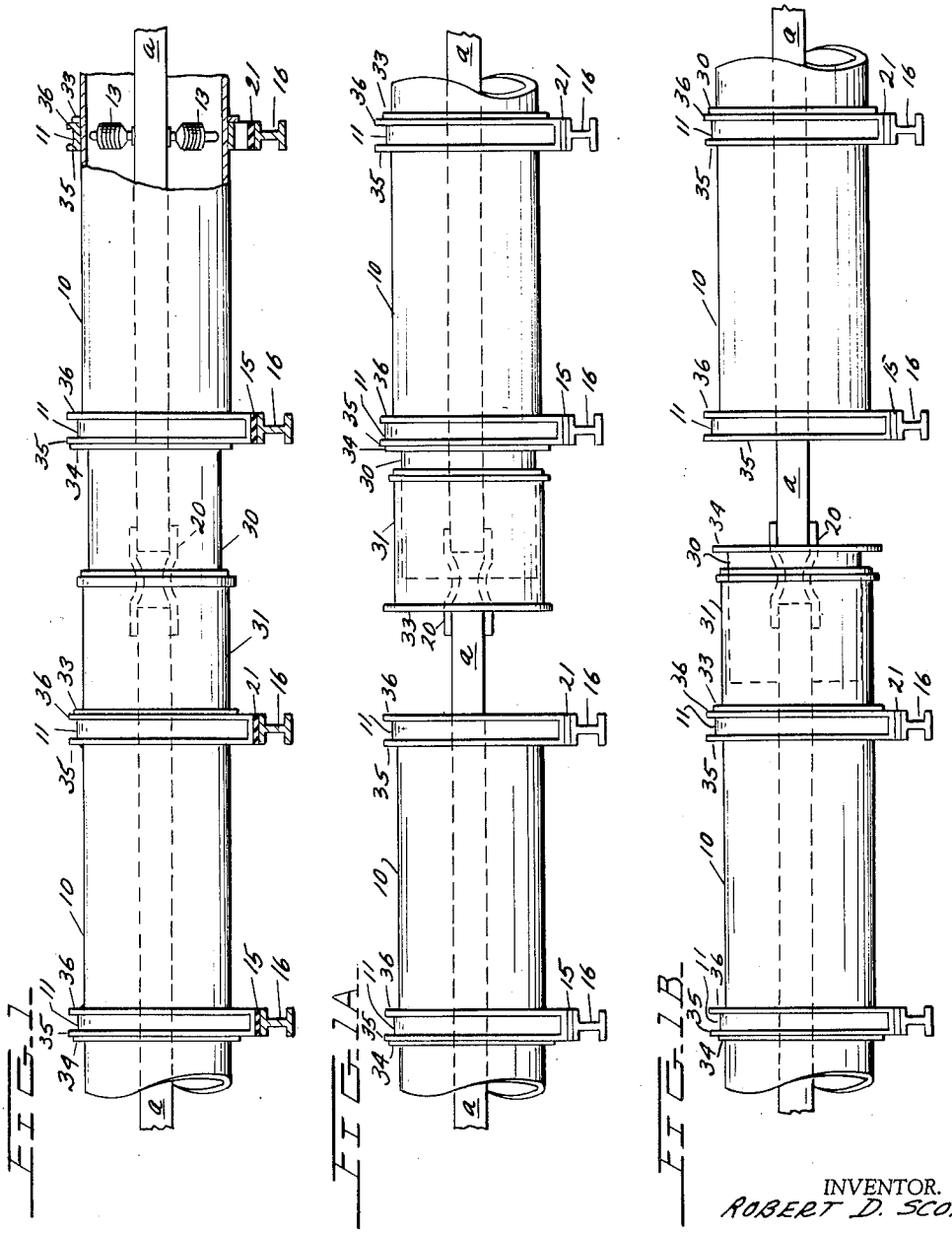
INVENTOR.
ROBERT D. SCOTT
BY
ATTORNEYS

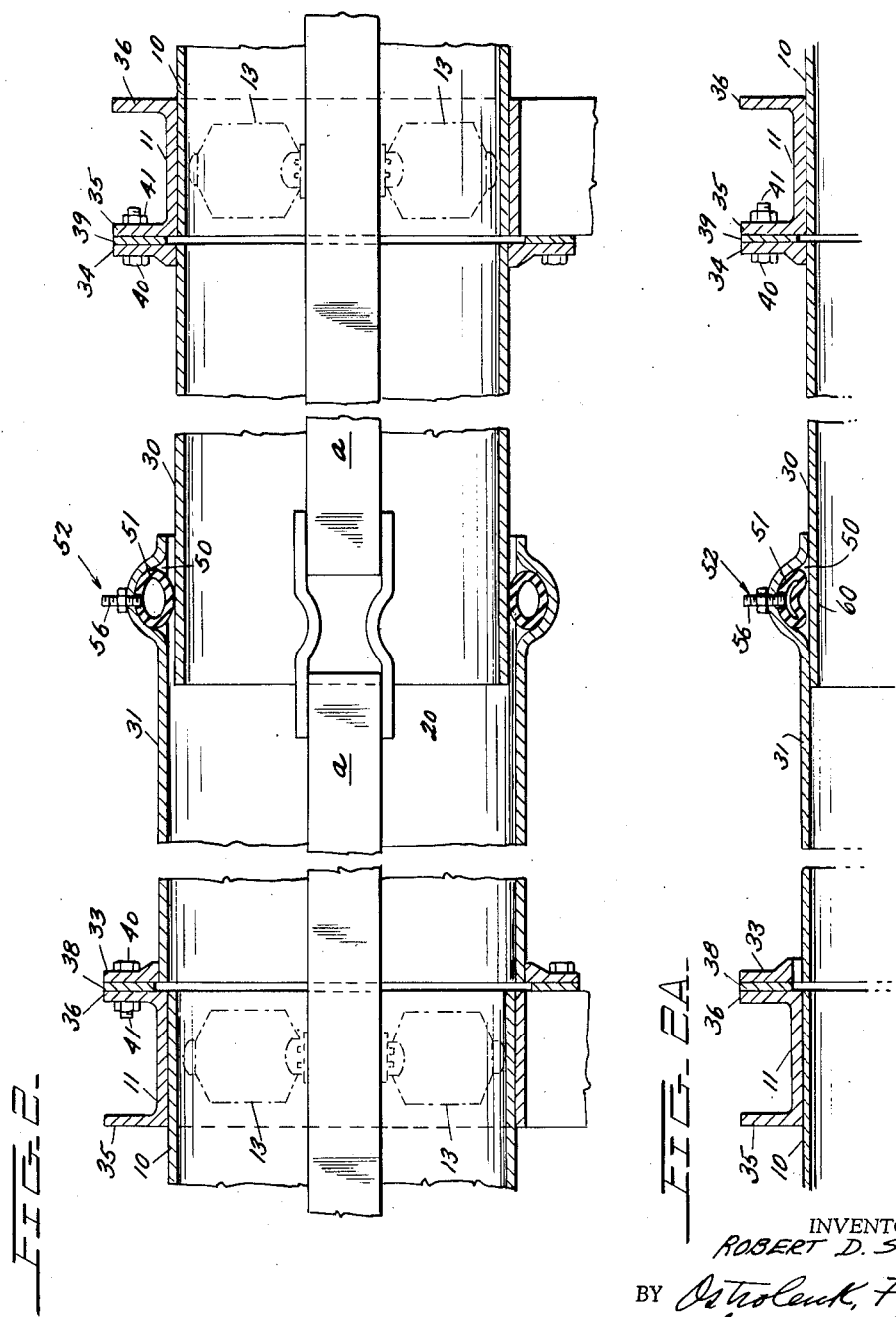

June 5, 1962 R. D. SCOTT 3,038,022
INFLATABLE GASKET FOR ISOLATED PHASE BUS
Filed Jan. 31, 1958 3 Sheets-Sheet 3
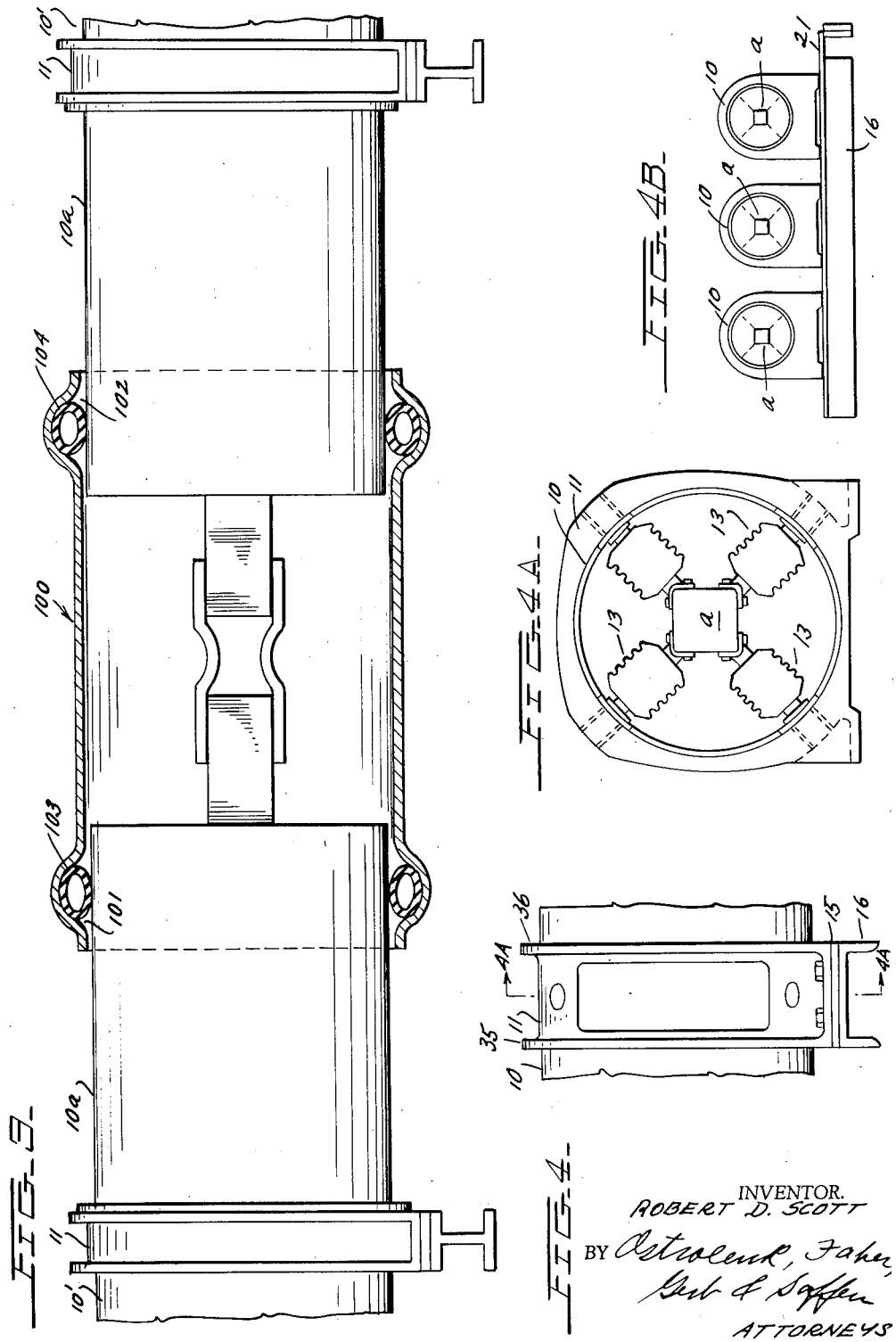
INVENTOR.
ROBERT D. SCOTT
BY
ATTORNEYS

United States Patent Office 3,038,022
Patented June 5, 1962

3,038,022
INFLATABLE GASKET FOR ISOLATED PHASE BUS
Robert D. Scott, Paoli, Pa., assignor to I-T-E Circuit Breaker Company, Philadelphia, Pa., a corporation of Pennsylvania
Filed Jan. 31, 1958, Ser. No. 712,413
2 Claims. (Cl. 174—99)

My invention relates to metal enclosed isolated phase bus bar enclosures and is more particularly directed to a weather and pressure-tight enclosure including inflatable gasket means, which is adapted to readily enable installation and inspection of the bus run.

In the construction of metal enclosed isolated bus structures, it is essential that the enclosure be water-tight and dust-tight for out door installation. Also, when the enclosed bus run is to be installed in hazardous locations such as areas where there are fumes, gasses, steam, etc., it is necessary that the bus run be pressure-tight to insure that the undesirable fumes, gasses, steam, etc., will not be drawn into and will be excluded from the enclosure.

In applications where it is desirable to increase the load capacity for a given bus run or where it is desirable to use smaller phase conductors for a given capacity, the bus run is usually cooled by circulating forced air in close proximity to the bus bars as shown in copending application, Serial No. 353,301 filed May 6, 1953, now Patent Number 2,861,119 issued November 18, 1958, entitled, "Closed Cycle Forced Cooled Isolated Phase Bus" to Perry J. Collonge and assigned to the assignee of the instant invention.

In this type of application, it is essential that the bus enclosure be pressure-tight so that the forced cooling air will not be permitted to flow out of the bus enclosure except at predetermined inlets and outlets. It is also essential in the design and construction of buses and enclosures to insure that same can be constructed and shipped in assembled units to thereby aid and facilitate the installation thereof.

Other design factors which must be considered in the construction of bus runs is to insure that the construction will require a minimum amount of gasket material. Furthermore, it is desirable to not only reduce the amount of gasket material but to provide a construction in which all of the gaskets run in a single direction, for example, perpendicular to the bus run rather than parallel thereto. That is, since clamping means are provided for either transverse or longitudinal connections, it is desirable that the gasket run either longitudinally or transversely.

In addition to providing all of the above-noted features, it is desirable that the enclosure be provided with means which will enable a person to readily and easily inspect the bus run. That is, it is desirable to provide an enclosure which is either slidably or hinge mounted to enable easy access to the bus run. Prior art covers have been sealed by making them in split halves which seal to each other by bolting through flat flanges and gaskets along the edges of the halves with the halves being sealed to the conductor support ring by means of a rectangular gasket partially inserted in a groove in the periphery of the ring. More recently the housing has been made as a complete cylindrical tube with sliding access covers which are sealed to the fixed portions of the housing by means of a solid annular gasket which is compressed by a clamp means. The solid annular gasket means is set forth in the W. H. Schymik Patent #2,783,299 entitled "Weather and Pressure-Tight Enclosure for Isolated Phase Bus."

In my novel invention, the main enclosure or housing for the conductors is a solid welded circular piece. Each housing section is provided with two insulator supporting rings which are welded to the outside of the enclosure with the housing or enclosure extending a short distance to each side of the supporting ring or to the supporting rings. A plurality of housing sections are mounted with a space between adjacent members which allow access to the conductors, conductor joints and insulators. Several methods of enclosing this space are set forth in my invention.

In one embodiment, the space is enclosed by welded sections consisting of two telescoping sections which are provided with 360° gaskets. One of the telescoping enclosures is slightly larger in diameter than the other and the method of sealing between the two sections comprises a hollow annular gasket inserted in a groove in the section having the larger diameter. This gasket is provided with an air connection and check valve so that it may be inflated and thereby expanded to form the seal against the other section.

With this first embodiment, the telescoping sections can be slipped over the conductor during installation and bolted in place. The enclosure thereby has a minimum of gasket material, all of which is circular with no horizontal or longitudinal gaskets and in no case does one gasket cross over another.

With this arrangement, a weather and pressure-tight enclosure is achieved and by sliding the telescoping sections either to the right or to the left, either set of insulators or conductors can be reached for installation and inspection.

In a second embodiment of my invention the spaced adjacent housing sections extend beyond the insulation supports. A single slidable cover member is utilized to complete the bus enclosure between the spaced ends of the adjacent housing sections. This member is tubular and of a slightly larger diameter than the housing sections. Inflatable annular gaskets are inserted in grooves at each end of the slidable member. With the gaskets deflated the slidable member can be moved in either direction along the longitudinal axis of the bus to telescope over the ends of the housing sections thereby facilitating installation and inspection. Air pressure may be relied upon to maintain the slidable member in a fixed longitudinal position.

The inflatable gasket means provides a simplified construction requiring fewer number of parts than means employing a solid gasket which is compressed by a clamp means. Improved sealing is obtained and the efficiency of the seal can be checked periodically by taking a reading of the air pressure within the inflatable gasket.

In order to facilitate movement of the telescoping sections the check, through which air is introduced to the gasket, may be removed and a partial vacuum pulled on the gasket. This forces the gasket to collapse so that less of the high friction gasket material will contact the sliding parts and the force urging the gasket against the moving parts will be materially reduced.

Accordingly, a primary object of my invention is to provide a novel enclosure for bus runs which is weather and pressure-tight and enables easy inspection of the bus run.

Another object of my invention is to provide a novel enclosure having a bus run, having all the gaskets placed in one direction.

Still another object of my invention is to provide a novel bus system which can be cooled by forced air to thereby increase its capacity since the enclosure will not permit the forced air to flow out of the bus enclosure except at predetermined inlets and outlets.

Another object of my invention is to provide a novel bus enclosure arrangement with a slidable enclosure section which enables rapid and easy inspection of the conductors, insulators, and conductor connections.

Still another object of my invention is to provide a simple construction for bus assembly so that the unit may be shipped in assembled parts.

A still further object of my invention is to provide an embodiment for bus run enclosures in which the space between adjacent solid welded housing sections is enclosed by at least one telescoping member operated in conjunction with inflatable gasket means.

Another object of my invention is to provide an enclosure arrangement having telescoping sections enclosing the space between adjacent solid housing sections in which all of the gaskets required to achieve a water and pressure-tight seal, are circular.

Another object of my invention is to provide an arrangement wherein a single enclosure covers the space between adjacent solid housing sections so that sealing of the conductors can be achieved with inflatable circular gaskets, and permits inspection of the bus run by sliding the solid enclosure over the housing sections.

These and other objects of my invention will be apparent from the following description when taken in connection with the drawings in which:

FIGURE 1 is a side view, showing the positioning of telescoping enclosures in the space between adjacent welded housing sections.

FIGURE 1a is a side view similar to FIGURE 1, showing the position of the outer telescoping enclosure with respect to the inner telescoping enclosure when the former is moved to the right to enable inspection of the conductor, conductor connections and insulating supports.

FIGURE 1b is a side view similar to FIGURE 1, showing the position of the inner and outer telescoping parts when the inner telescoping part is moved to the left to enable a person to gain access to the conductor, conductor connections and insulators which support the conductor to the right.

FIGURE 2 is a cross-sectional view of FIGURE 1, showing the details of the construction and connection of telescoping members with the gasket means inflated.

FIGURE 2a is a cross-sectional view of the gasket means of FIGURE 2 showing the gasket means when a partial vacuum has been drawn.

FIGURE 3 is a cross-sectional view showing a second embodiment of my invention wherein the space between the adjacent solid housing sections is enclosed by a single solid circular enclosure unit.

FIGURE 4 is a side view of a portion of one housing section with the insulator support ring attached thereto.

FIGURE 4a is a side view of the insulator support ring used for an isolated phase bus run and is taken along the line 4a—4a of FIGURE 4.

FIGURE 4b is a schematic representation of the positioning of the various phases of the bus run using the insulating supports of FIGURE 4a.

Referring now to FIGURES 1, 2, 4, 4a and 4b, the main enclosure for the bus conductors a, b, and c, comprises the housing section 10. The housing section 10 is a 360° hollow cylindrical solid section which is welded together to eliminate the necessity of any longitudinal gaskets.

U shaped annular insulator support members 11 support the housing 10 and are placed near the ends thereof as seen in FIGURE 1.

The conductors a, are supported within the housing 10 by insulators 13 which are supported and secured to the insulator support members 11, as seen in FIGURE 4a.

The entire structure, including the housing sections 10 and the insulator support members 11, is supported on bracket 16 and insulated therefrom by insulator 15, as seen in FIGURES 1 and 4. That is, all of the support rings 11 which are positioned on the left end of the one piece welded housing section 10, are insulated from the support 16. However, as best seen in FIGURE 1, the support brackets 11, which are positioned on the right end of the welded housing sections 10, are electrically connected to ground bus 21 to thereby insure that each section of the housing is properly grounded. As will hereinafter be more fully described, the portion of the telescoping members adjacent each housing section, is electrically connected thereto with means to provide electrical insulation between adjacent telescoping members so that all parts of the enclosures and housings are properly grounded.

As seen in FIGURE 1, the conductor a will extend past the end of the one piece housing 10 and adjacent conductors may be connected together by means of straps 20 or in any other desirable manner.

My invention relates to the manner and means in which the space between the adjacent welded housing sections 10 can be appropriately enclosed to insure a weather and water-tight seal, and also enable easy access to the conductors and insulators.

In order to achieve the above, I provide telescoping enclosures 30—31. Each of the enclosures 30—31 are hollow cylindrical members which are welded together to form a solid 360° enclosure, thereby eliminating the necessity of a longitudinal gasket.

The enclosure section 31 has a slightly larger diameter than the enclosure section 30 so that the latter unit may fit internal of the former, as seen in FIGURES 1 and 2.

As thus seen in the detailed view of FIGURE 2, the enclosure section 31 is provided with a flange ring 33 which is welded to one end thereof and the enclosure section 30 is provided with a similar flange ring 34 which is welded to the outer periphery.

Each of the telescoping sections 30—31 are respectively secured to the leg 35—36 of the U shaped annular insulator support members 11.

Metallic gaskets 38—39 are positioned between the leg 36 and the annular flange 33 of enclosure 33 and leg 35, and anular flange 34 of enclosure section 30 respectively. Metallic gasket 38—39 extend for 360°.

A plurality of bolts and nuts 40—41 are provided to secure the enclosure section 31 to the leg 36 through the flange 35 and to secure the enclosure section 30 to the leg 35 by means of the flange 34. Thus it will be seen that after the telescoping enclosure sections 30—31 are secured in position, the metallic gaskets 38—39 will insure that the section 31 is at the same potential as the housing section 10 on the left and also insure that the enclosure section 30 will be at the same potential as the housing section 10 on the right.

As heretofore been noted, each housing section 10 is maintained at grounded potential by means of ground buses 21 and hence, the metallic gasket 38—39 will insure that the telescoping sections 30—31 are also at ground potential.

Thus it will be seen that the circular metallic gasket 39 serves a dual function of electrically tying the inner telescoping enclosure 30 to the housing section 10 on the right and also in that there will be a pressure and water-tight seal therebetween.

The metallic gasket 38 also serves a dual function of electrically tying the outer telescoping enclosure 31 to the housing section 10 at the left and insures that there will be a water seal therebetween.

With respect to the outer telescoping enclosure 31 to the inner telescoping enclosure 30, the inflatable circular gasket 51 will insure a water and pressure-tight seal therebetween and the circular insulating means 51 will insure that these two units are not electrically tied together.

One method of providing a seal between enclosure section 31 and enclosure section 30 is illustrated in detail in FIGURES 2 and 2a. In this arrangement section 31 is provided with an annular groove 50 in the inner surface thereof. A hollow inflatable gasket 51 is disposed within groove 50. The stem 56 of check valve 52 extends from gasket 51 through an appropriate opening in the wall of groove 50. By passing air through valve 52 gasket 51 may be inflated to the shape illustrated in FIGURE 2. In this condition, gasket 51 provides a gas tight seal between sections 30 and 31 and also provides an insulating means therebetween.

Thus it will be seen that the circular metallic gasket 39 serves a dual function of electrically tying the inner telescoping enclosure 30 to the housing section 10 on the right and also in that there will be a pressure and water tight seal therebetween. The metallic gasket 38 serves the same dual function as metallic gasket 39 in respect to the left hand housing section 10 and the outer telescoping enclosure 31.

In the event that it is desired to inspect the bus conductor and insulators 13 associated with the support bracket 11 at the left of FIGURE 2, the plurality of nuts and bolts 40, 41 which tie the circular flange 33 to the leg 36, are loosened and removed. Thereafter the pressure within gasket 51 is permitted to run down thereby relieving the pressure between gasket 51 and the outer telescoping surface of section 30. Thus the operator can slide the outer telescoping enclosure 30 seen in FIGURE 1 and gain access to the interior of left hand housing 10.

In some cases the core of valve 52 is removed and a vacuum means attached to stem 56 to draw a partial vacuum in gasket 51. This will cause gasket 51 to partially collapse to the shape illustrated in FIGURE 2a with a cavity 60 being formed in the inner peripheral surface thereof since this surface is constructed of a more flexible material than the material of the remainder of the gasket wall. It is to be noted that in the partially collapsed position gasket 51 does not contact inner section 30 thereby materially reducing the effect required to longitudinally move section 30 with respect to section 31.

After the inspection is made and it is desired to return the telescoping enclosure to the position of FIGURE 1, the outer telescoping section 31 is moved from the position of FIGURE 1a to the left. Nut and bolt means 40, 41 is then secured in place thereby fastening section 31 to left hand housing 10. Thereafter gasket 51 is inflated to the shape of FIGURE 2 to establish the gas tight seal between the outer 31 and inner 30 sections as heretofore explained.

In the event it is desired to inspect the insulators 13 which are associated with the support unit on the right, the operator need only remove the plurality of nuts and bolts 40 and 41 associated with the circular flanges 34, 35, deflate gasket 51, and slide section 30 within section 31.

Referring more particularly to FIGURE 3, the bus housings 10' illustrated in this embodiment include end portions 10a which extend beyond insulator supports 11. A single cylindrical cover 100 is provided to bridge the gap between the end portions 10a of housings 10'. Cover 100 is provided with annular grooves 101, 102 formed in the inner surface thereof adjacent to each of the ends thereof. Inflatable gaskets 103, 104 are disposed within grooves 101, 102 respectively. Each of the inflatable gaskets 103, 104 is identical in construction to inflatable gasket 51 hereinbefore described.

With cover 100 in the position of FIGURE 3 and gaskets 103, 104 fully inflated, gas tight seals are maintained between cover 100 and both housing sections 10'. In order to gain access to the right hand housing 10', gaskets 103, 104 are collapsed by drawing a partial vacuum as hereinbefore explained. This relieves the pressure between gaskets 103, 104 and housing section 10' thereby permitting the operator to move cover 100 to the left telescoping over the left hand end portion 10a and establishing an access space between the right hand end of cover 100 and the right hand end portion 10a. Similarly, cover 100 may be moved to the right when it is desired to gain access to left hand housing 10'.

When gaskets 103, 104 are fully inflated they will usually bear against end portions 10a with sufficient force to prevent longitudinal movement of cover 100. However, it may become necessary to bolt cover 100 to one of the housings 10' to thereby maintain the longitudinal position of cover 100. This bolt (not shown) may be utilized as a grounding means for cover 100. In lieu of the bolt, sliding spring contacts may be secured to cover 100 near one end thereof to contact one of the end portions 10a thereby establishing a ground for cover 100 yet insulating cover 100 from one of the housings 10'.

Thus it will be seen that I have provided a novel inflatable gasket means whereby a pressure and water tight seal may be maintained between adjacent sections of isolated phase bus and at the same time permit ready access to the bus for purposes of inspection and installation.

While the two embodiments of my invention hereinbefore described both illustrate an inflatable gasket positioned by a groove in the larger diameter telescoping section, it should be apparent that my invention may be carried out equally well by providing an outer circumferential groove in the small diameter telescoping section with the inflatable gasket being positioned in this groove. Further grooves may be provided in both telescoping members.

Although I have here described preferred embodiment of my novel invention, many variations and modifications will now be apparent to those skilled in the art, and I therefore prefer to be limited, not by the specific disclosure herein, but only by the appended claims.

I claim:

1. In combination a first and second section of isolated phase bus each being comprised of an open ended housing and a conductor disposed within said housing and insulated therefrom; said conductor extending beyond the ends of said housing; said conductors being secured to one another and positioned in axial alignment; said housings being positioned in axial alignment with a gap between the ends thereof; a gas tight and water tight cover means operatively connected to said housings in axial alignment therewith and occupying said gap; said cover means comprising a single member having annular grooves adjacent to each of the ends thereof; said grooves overlapping the ends of said housings adjacent said gap; the inner periphery of said single member being greater than the outer periphery of said housings; said grooves being semi-circular; said cover means having a circular cross-section including inflatable gasket means disposed within each of said grooves; each of said inflatable gasket means having a first portion adjacent the outer periphery of its associated housing and a remaining portion adjacent its associated groove; said remaining portion being formed of a first material; said first portion being formed of a second material which is more flexible than said first material; each of said inflatable gasket means including valve means for permitting inflation and deflation of said inflatable gasket means; said first portion exhibiting greater contraction than said remaining portion during deflation to completely disengage said inflatable gasket means from the outer periphery of said housings; said second portion being adapted to retain its position abutting the semi-circular groove enabling said single member to be longitudinally slidable when said gasket means are deflated.

2. In combination a first and second section of isolated phase bus each being comprised of an open ended housing and a conductor disposed within said housing and insulated therefrom; said conductor extending beyond the ends of said housing, said conductors being secured to one another and positioned in axial alignment; said housings being positioned in axial alignment with a gap between the ends thereof; a gas and watertight telescoping cover means operatively connected to said housings in axial alignment therewith and occupying said gap; said cover means comprising a first cover removably secured to one of said housings and a second cover removably secured to the other of said housings; the inner periphery of said first cover being greater than the outer periphery of said second cover; said first cover having an edge overlapping said second cover; said edge having a semi-circular groove; inflatable gasket means positioned in said housing; said gasket means having a circular cross-section having a first portion adjacent the outer periphery of said second cover and a remaining portion adjacent said groove; said inflatable gasket means including valve means for permitting inflation and deflation of said inflatable gasket means being formed of a first material; the first portion of said inflatable gasket means being formed of a second material of greater flexibility than said first material; said first portion exhibiting greater contraction than said remaining portion during deflation to disengage said gasket means from said second cover; said second portion being adapted to retain its position abutting the semi-circular groove enabling said first cover to be moved longitudinally slideable when detached from said one housing and said gasket means is deflated.

References Cited in the file of this patent

UNITED STATES PATENTS

| | | |
|---|---|---|
| 672,475 | Cavallaro | Apr. 23, 1901 |
| 1,966,202 | Pfefferle | July 10, 1934 |
| 2,306,160 | Freyssinet | Dec. 22, 1942 |
| 2,309,974 | Miller | Feb. 2, 1943 |
| 2,648,554 | Gilbert | Aug. 11, 1953 |
| 2,783,299 | Schymik | Feb. 26, 1957 |
| 2,784,012 | Killian et al. | Mar. 5, 1957 |
| 2,864,631 | Kemp | Dec. 16, 1958 |

FOREIGN PATENTS

| | | |
|---|---|---|
| 309,531 | Great Britain | Jan. 2, 1930 |
| 746,357 | France | Mar. 7, 1933 |